US010073970B2

(12) United States Patent
Kraemer (10) Patent No.: US 10,073,970 B2
(45) Date of Patent: Sep. 11, 2018

(54) SYSTEM AND METHOD FOR REVERSE COMMAND SHELL DETECTION

(71) Applicant: Carbon Black, Inc., Waltham, MA (US)

(72) Inventor: Jeffrey Albin Kraemer, Wellesley, MA (US)

(73) Assignee: Carbon Black, Inc., Waltham, MA (US)

( * ) Notice: Subject to any disclaimer, the term of this patent is extended or adjusted under 35 U.S.C. 154(b) by 0 days.

(21) Appl. No.: 15/457,719

(22) Filed: Mar. 13, 2017

(65) Prior Publication Data

US 2017/0270296 A1   Sep. 21, 2017

Related U.S. Application Data

(60) Provisional application No. 62/308,292, filed on Mar. 15, 2016.

(51) Int. Cl.
*G06F 21/55* (2013.01)
*G06F 9/451* (2018.01)
(Continued)

(52) U.S. Cl.
CPC ............ *G06F 21/554* (2013.01); *G06F 9/451* (2018.02); *G06F 21/52* (2013.01); *G06F 21/566* (2013.01);
(Continued)

(58) Field of Classification Search
None
See application file for complete search history.

(56) References Cited

U.S. PATENT DOCUMENTS 5,974,549 A    10/1999 Golan
8,015,604 B1    9/2011 Tidwell et al.
(Continued)

FOREIGN PATENT DOCUMENTS

EP    2 750 069 A1    7/2014
GB    2502774 A    5/2012
(Continued)

OTHER PUBLICATIONS

Burger, E. et al., "Taxonomy Model for Cyber Threat Intelligence Information Exchange Technologies," Information Sharing & Collaborative Security, ACM, New York, Nov. 3, 2014, pp. 51-60. Ten pages.
(Continued)

*Primary Examiner* — Benjamin E Lanier
(74) *Attorney, Agent, or Firm* — HoustonHogle LLP (57) ABSTRACT

A system and method for detecting reverse command shell intrusions at a process-level on a user device is disclosed. In one embodiment, the system detects each process starting on an operating system of the user device, such as a mobile phone or laptop computer, and monitors Application Programming Interface (API) calls between each process and the operating system. The system then determines whether each process is associated with a reverse command shell intrusion based on information associated with each process and/or the API calls, and executes security policies against the processes associated with the reverse command shell intrusion to remediate the processes. In another embodiment, the system determines whether processes starting on a user device are associated with a reverse command shell intrusion by monitoring and analyzing information associated with the parent process of each process and/or API calls between each parent process and the operating system.

3 Claims, 6 Drawing Sheets

(51) Int. Cl.
*G06F 21/52* (2013.01)
*H04L 29/06* (2006.01)
*G06F 21/56* (2013.01)

(52) U.S. Cl.
CPC ........ *H04L 63/105* (2013.01); *H04L 63/1425* (2013.01)

(56) References Cited

U.S. PATENT DOCUMENTS

| | | |
|---|---|---|
| 8,839,435 B1 | 9/2014 | King |
| 9,165,142 B1 | 10/2015 | Sanders et al. |
| 9,648,045 B2 | 5/2017 | Mooring et al. |
| 2006/0277539 A1 | 12/2006 | Amarasinghe et al. |
| 2007/0150957 A1 | 6/2007 | Hartrell et al. |
| 2009/0126017 A1 | 5/2009 | Chahal |
| 2010/0017879 A1 | 1/2010 | Kuegler et al. |
| 2010/0031361 A1 | 2/2010 | Shukla |
| 2010/0077481 A1 | 3/2010 | Polyakov et al. |
| 2013/0047255 A1 | 2/2013 | Dalcher |
| 2013/0283370 A1 | 10/2013 | Vipat et al. |
| 2014/0196148 A1 | 7/2014 | Chahal |
| 2015/0128274 A1 | 5/2015 | Giokas |
| 2015/0326592 A1* | 11/2015 | Vissamsetty ........ H04L 63/1408 726/24 |
| 2015/0332048 A1 | 11/2015 | Mooring et al. |
| 2015/0334126 A1 | 11/2015 | Mooring et al. |
| 2016/0072836 A1 | 3/2016 | Hadden et al. |
| 2017/0124327 A1 | 5/2017 | Kumbhar et al. |
| 2017/0272452 A1 | 9/2017 | Kraemer et al. |
| 2017/0272462 A1 | 9/2017 | Kraemer et al. |
| 2017/0272469 A1 | 9/2017 | Kraemer et al. |

FOREIGN PATENT DOCUMENTS

| | | |
|---|---|---|
| WO | 2015/009296 A1 | 1/2015 |
| WO | 2017/003597 A1 | 1/2017 |
| WO | 2017160765 A1 | 9/2017 |
| WO | 2017160770 A1 | 9/2017 |
| WO | 2017160772 A1 | 9/2017 |

OTHER PUBLICATIONS

Hunt, G. et al., "Detours: Binary Interception of Win32 Function," Proceedings of the 3rd USENIX Windows NT Symposium, Seattle, WA, Jul. 12-13, 1999. Ten pages.
Leitch, J., "Process Hollowing," http://www.autosectools.com, Nov. 1, 2014. Ten pages.
International Search Report and the Written Opinion of the International Searching Authority, dated May 26, 2017, from International Application No. PCT/US2017/022167, filed on Mar. 13, 2017. Twelve pages.
International Search Report and the Written Opinion of the International Searching Authority, dated May 8, 2017, from International Application No. PCT/US2017/022173, filed on Mar. 13, 2017. Sixteen pages.
International Search Report and the Written Opinion of the International Searching Authority, dated May 24, 2017, from International Application No. PCT/US2017-022181, filed on Mar. 13, 2017. Fourteen pages.
International Search Report and the Written Opinion of the International Searching Authority, dated May 8, 2017, from International Application No. PCT/US2017/022184, filed on Mar. 13, 2017. Fifteen pages.
Harrell, "Process Hollowing Meets Cuckoo Sandbox", Feb. 2015, Journey Into Incident Response, pp. 1-7.
Monti, "Analyzing Malware Hollow Processes", Mar. 2011, Spiderlabs Blog, trustwave.com, pp. 1-12.
Nayyar, "An Opportunity in Crisis", 2014, SANS Institute, pp. 1-94.
VirtuaiAllocEx function, 2017, microsoft.com, pp. 1-6.

* cited by examiner

SYSTEM AND METHOD FOR REVERSE COMMAND SHELL DETECTION

RELATED APPLICATIONS

This application claims the benefit under 35 USC 119(e) of U.S. Provisional Application No. 62/308,292 filed on Mar. 15, 2016, which is incorporated herein by reference in its entirety.

BACKGROUND OF THE INVENTION

Data security threats pose a major operational and financial risk for individual persons and businesses. The threats typically occur due to attacks upon enterprise networks of businesses. Typically, the attacks utilize malicious computer software, or malware, that targets devices within the enterprise networks. In examples, the target devices include data communications equipment such as firewalls, user account databases, information servers, protocol routers, and user devices. Examples of user devices include smartphones, tablet computing devices, and laptop computers running operating systems such as Windows, Android, Linux, or IOS, in examples. Windows is a registered trademark of Microsoft Corporation. Android is a registered trademark of Google, Inc. IOS is a registered trademark of Apple, Inc.

Attack actors often use malware as a key component of their attacks upon devices in the enterprise networks. The techniques or actions that the actors take when launching their attacks are also referred to collectively as Tools, Tactics, and Procedures (TTPs). Malware is often designed to disrupt network communications, gain control over computers or networks, or secretly gather personal information about users, businesses, and government entities. Malware typically includes viruses, trojans, adware, and spyware, to list a few examples. Analysis of TTPs and the malware utilized therein can provide useful information for preventing an attack, attributing an attack to a specific actor, and to predict future attacks, in examples.

SUMMARY OF THE INVENTION

Command shell processes ("command shells") are powerful tools that execute on user devices. Command shells provide a user with access to many of the services and resources of the operating system of a user device. Command shells access the services and resources of the operating system by issuing software function calls to the operating system using an Application Programming Interface (API) of each operating system. Command shells are typically any type of interactive software program that takes commands via stdin/stdout. Examples of command shells include command-line interpreter programs that are native to each operating system such as the "cmd.exe" process for the Windows operating system and the "bash" shell for Unix/Linux-based operating systems, script interpreter programs such as Perl and Python, or even a database application that takes Software Query Language (SQL) commands as input for accessing a database.

Command shells are often used interactively by an authorized user logged into the user device. In this normal case, the command shell is interactive and launched either by a desktop application (e.g. explorer.exe in Windows) or another interactive shell process. Command shells are also used by applications to launch another program, or execute a specific command.

One of the TTPs in which actors utilize malware to breach the data of and access resources within target devices is a reverse command shell intrusion attack upon the target devices. A reverse command shell intrusion attack typically occurs on a target device when an actor, using an attack source user device, creates an unauthorized network connection to the target user device and directs the target device to invoke and pass commands to a command shell (e.g. cmd.exe in Microsoft Windows) on the target device via the network connection. Then, the attacker typically modifies and/or redirects the output stream of the created command shell to send the output of commands specified within the command shell back over the network connection to the attacker. Once the command shell is created and running, the attacker often then remotely issues commands for the command shell to execute.

Businesses are increasingly utilizing data security systems to identify potential data security threats within their enterprise networks such as reverse command shell intrusion attacks. The systems are typically deployed as a network-level service that monitors data traffic over the enterprise network and analyzes the data traffic for indicia of attacks. The systems can then send messages that include information concerning the potential attacks to security personnel such as incident responders via email or data logging via a Security Information and Event Manager ("SIEM"). From this information, the incident responders can take actions upon the user devices in response to the potential threats.

Current solutions for responding to threats such as reverse command shell intrusion attacks have limitations, however. In one example, the systems typically detect the threats at the level of the enterprise network, not at the level of the target devices. When systems utilizing network-level attack detection identify indicia of a reverse command shell intrusion, for example, it is often the case that multiple data breaches upon the target devices have already occurred, over hours or perhaps even days, before the systems have identified the attack. In addition, because the systems operate at the network level and use messaging to announce potential attacks, any actions to take in response to the intrusions are typically executed in a manual fashion by incident responders and are typically limited to device-level actions, such as a quarantine of an entire device by disabling its network connections or disabling its power.

In contrast, the present invention provides a data security system with the ability to detect and block reverse command shell intrusions at the process level of the target user devices. Upon detecting such a threat, the target user devices can then communicate with an endpoint telemetry aggregation system of the data security system, to determine any process-level remediation actions, and to execute the remediation actions. This enables the data security system to narrowly tailor its remediation and/or response to the affected process(es), while leaving the remaining processes and the overall target system otherwise intact and operational.

For this purpose, the present invention utilizes a process-level code interception technique provided by a runtime security agent process ("security agent") executing within each user device. The security agent injects executable detour code into each running process. The injected detour code intercepts key user level API calls between the process and the operating system using trampoline techniques similar to that employed by the Microsoft "Detours" library, in one example. Detours is a library for intercepting arbitrary Win32 executable functions on x86 machines at run-time.

The detour code of each process then sends information concerning the process and/or the API calls to the security agent. The security agent then observes and tracks the API calls. Based on the information concerning the process and/or the API calls, the security agent determines whether each process is associated with a reverse command shell attack, and can remediate each affected process.

In general, according to one aspect, the invention features a method for tracking a reverse command shell intrusion on a user device. The method comprises detecting a process starting on the user device and preparing the process to monitor Application Programming Interface (API) calls between the process and an operating system of the user device. The method also comprises determining whether the process is associated with a reverse command shell intrusion based on information associated with the process and/or the API calls, and executing security policies against the process associated with the reverse command shell intrusion.

For this purpose, in one embodiment, the method determines whether the process is associated with a reverse command shell intrusion based upon the information associated with the process and/or the API calls by determining whether the process is a command shell process and analyzing a parent process of the command shell process, and determining a possible existence of a reverse shell intrusion in response to determining that the process is a command shell process and that the parent process of the command shell process is a command shell process, a user login process, or a desktop process.

The method can also additionally or alternatively determine whether the process is associated with a reverse command shell intrusion based upon the information associated with the process and/or the API calls by determining whether the process is a command shell process and analyzing a parent process of the command shell process, analyzing a connection of the parent process, and determining a possible existence of reverse shell intrusion in response to determining that the connection of the parent process has a connection to a network application located in a network that is remote.

The method can also additionally or alternatively determine whether the process is associated with a reverse command shell intrusion based upon the information associated with the process and/or the API calls by determining that the process is a command shell process and analyzing a parent process of the command shell process, detecting a readFile( ) API call, determining that a file descriptor of the readFile( ) API call matches a handle to a stdin stream of the command shell process, identifying commands passed by the parent process to the command shell process in the stdin stream of the command shell process, and concluding whether the process is a reverse command shell intrusion based on the commands.

The method can also additionally or alternatively determine whether the process is associated with a reverse command shell intrusion based upon the information associated with the process and/or the API calls by determining that the process is a command shell process and analyzing a parent process of the command shell process, detecting a readConsole( ) API call, determining based on the readConsole( ) API call that the parent process is reading from a stdin stream of the command shell process, identifying commands passed by the parent process to the command shell process in the stdin stream of the command shell process, and concluding whether the process is a reverse command shell intrusion based on the commands.

In another embodiment, the method determines whether the process is associated with a reverse command shell intrusion based upon the information associated with the process and/or the API calls by detecting API calls that are associated with network connections, and determining a possible existence of a reverse shell intrusion upon a child process of the process in response to determining that, based on the API calls, the parent process is receiving requests to open a connection to a network application located in a network that is remote and/or that the parent process is receiving data over a connection to a network application located in a network that is remote.

The method can also additionally or alternatively determine whether the process is associated with a reverse command shell intrusion based upon the information associated with the process and/or the API calls by detecting API calls that are associated with creating a pipe, tracking file handles of the pipe, and determining a possible existence of a reverse shell intrusion upon a child process of the process in response to detecting a writeFile( ) API call and determining that the writeFile( ) API call is writing to the child process. Typically, the method determines that the writeFile( ) API call is writing to the child process by determining that at least one file handle of the pipe is attached to a stdin stream of the child process. Upon tracking the file handles of the pipe and determining that the writeFile( ) API call is writing to the child process, the method can additionally examine read and/or write operations upon at least one file handle of the pipe, identify commands passed by the parent process to the child process via the at least one file handle of the pipe, and conclude whether the child process is associated with a reverse command shell intrusion based on the commands.

The method can also determine whether the process is associated with a reverse command shell intrusion based upon the information associated with the process and/or the API calls by detecting API calls that are associated with creating a pipe, tracking file handles of the pipe, detecting API calls that are associated with creating a new child process of the process, the process being a parent process of the new child process, and determining a possible existence of a reverse shell intrusion upon the new child process in response to determining that the new child process is a command shell process or an interpreter process.

Upon determining a possible existence of a reverse shell intrusion upon the new child process, the method can additionally identify process startup information of the new child process, and determine a possible existence of a reverse shell intrusion upon the new child process in response to determining that a stdin stream and a stdout stream of the new child process are redirected to the file handles of the pipe.

Upon determining a possible existence of a reverse shell intrusion upon the new child process, the method can also additionally identify that a stdin stream and a stdout stream of the new child process are redirected to the file handles of the pipe, examine read and/or write operations upon at least one file handle of the pipe, identify commands passed by the parent process to the new child process via the at least one file handle of the pipe, and conclude whether the new child process is associated with a reverse command shell intrusion based on the commands.

Upon determining a possible existence of a reverse shell intrusion upon the new child process, the method can also additionally examine read and/or write operations upon the file handles of the pipe, identify output sent from the new child process to the parent process via the file handles of the pipe, and conclude whether the new child process is associated with a reverse command shell intrusion by determining whether the new child process sent its output in response to the commands.

In general, according to another aspect, the invention features a system for tracking a reverse command shell intrusion on a user device. The system includes an endpoint telemetry aggregation system and a security agent executing on the user device. The endpoint telemetry aggregation system stores security policies for remediating processes executing on the user device that are associated with a reverse command shell intrusion.

The security agent prepares a process to monitor Application Programming Interface (API) calls between the process and an operating system of the user device, receives information associated with the process and/or the API calls, sent from the process, and determines whether the process is associated with a reverse command shell intrusion based on the information associated with the process and/or the API calls. The security agent also requests the security policies from the endpoint telemetry aggregation system, and executes the security policies against the process associated with the reverse command shell intrusion.

Typically, the process associated with the reverse command shell intrusion is a command-line interpreter program that is native to the operating system of the user device, a script interpreter program, and/or a database application that takes Software Query Language (SQL) commands as input for accessing a database.

According to an embodiment, the security agent determines whether the process is associated with a reverse command shell intrusion by determining whether the process is a command shell process and analyzing a parent process of the command shell process and determining a possible existence of a reverse shell intrusion in response to determining that the process is a command shell process and that the parent process of the command shell process is a command shell process, a user login process, or a desktop process.

The security agent can also additionally or alternatively determine whether the process is associated with a reverse command shell intrusion by determining whether the process is a command shell process and analyzing a parent process of the command shell process, analyzing a connection of the parent process, and determining a possible existence of reverse shell intrusion in response to determining that the connection of the parent process has a connection to a network application located in a network that is remote.

The security agent can also additionally or alternatively determine whether the process is associated with a reverse command shell intrusion by determining that the process is a command shell process and analyzing a parent process of the command shell process, detecting a readFile( ) API call, determining that a file descriptor of the readFile( ) API call matches a handle to a stdin stream of the command shell process, identifying commands passed by the parent process to the command shell process in the stdin stream of the command shell process, and concluding whether the process is a reverse command shell intrusion based on the commands.

The security agent can also additionally or alternatively determine whether the process is associated with a reverse command shell intrusion by determining that the process is a command shell process and analyzing a parent process of the command shell process, detecting a readConsole( ) API call, determining based on the readConsole( ) API call that the parent process is reading from a stdin stream of the command shell process, identifying commands passed by the parent process to the command shell process in the stdin stream of the command shell process, and concluding whether the process is a reverse command shell intrusion based on the commands.

In another embodiment, the security agent determines whether the process is associated with a reverse command shell intrusion by detecting API calls that are associated with network connections, and determining a possible existence of a reverse shell intrusion upon a child process of the process in response to determining that, based on the API calls, the parent process is receiving requests to open a connection to a network application located in a network that is remote and/or that the parent process is receiving data over a connection to a network application located in a network that is remote.

The security agent might determine whether the process is associated with a reverse command shell intrusion by detecting API calls that are associated with creating a pipe, tracking file handles of the pipe, and determining a possible existence of a reverse shell intrusion upon a child process of the process in response to detecting a writeFile( ) API call and determining that the writeFile( ) API call is writing to the child process.

The security agent might also determine whether the process is associated with a reverse command shell intrusion by detecting API calls that are associated with creating a pipe, tracking file handles of the pipe, detecting API calls that are associated with creating a new child process of the process, the process being a parent process of the new child process, and determining a possible existence of a reverse shell intrusion upon the new child process in response to determining that the new child process is a command shell process or an interpreter process.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2 is a schematic diagram showing a process-level representation of an operating system of an exemplary user device in an enterprise network, where the user device is a target of a reverse command shell attack by an attack source device, and where the diagram also shows: typical interactions between processes on the user device and the attack source device during a reverse command shell intrusion attack upon the processes of the user device; interactions between the security agent and other processes starting on the user device for enabling the security agent to detect reverse command shell intrusion attacks; and interactions between the user device and an endpoint telemetry system that includes security policies that the security agent uses to remediate the processes associated with the reverse command shell attack;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
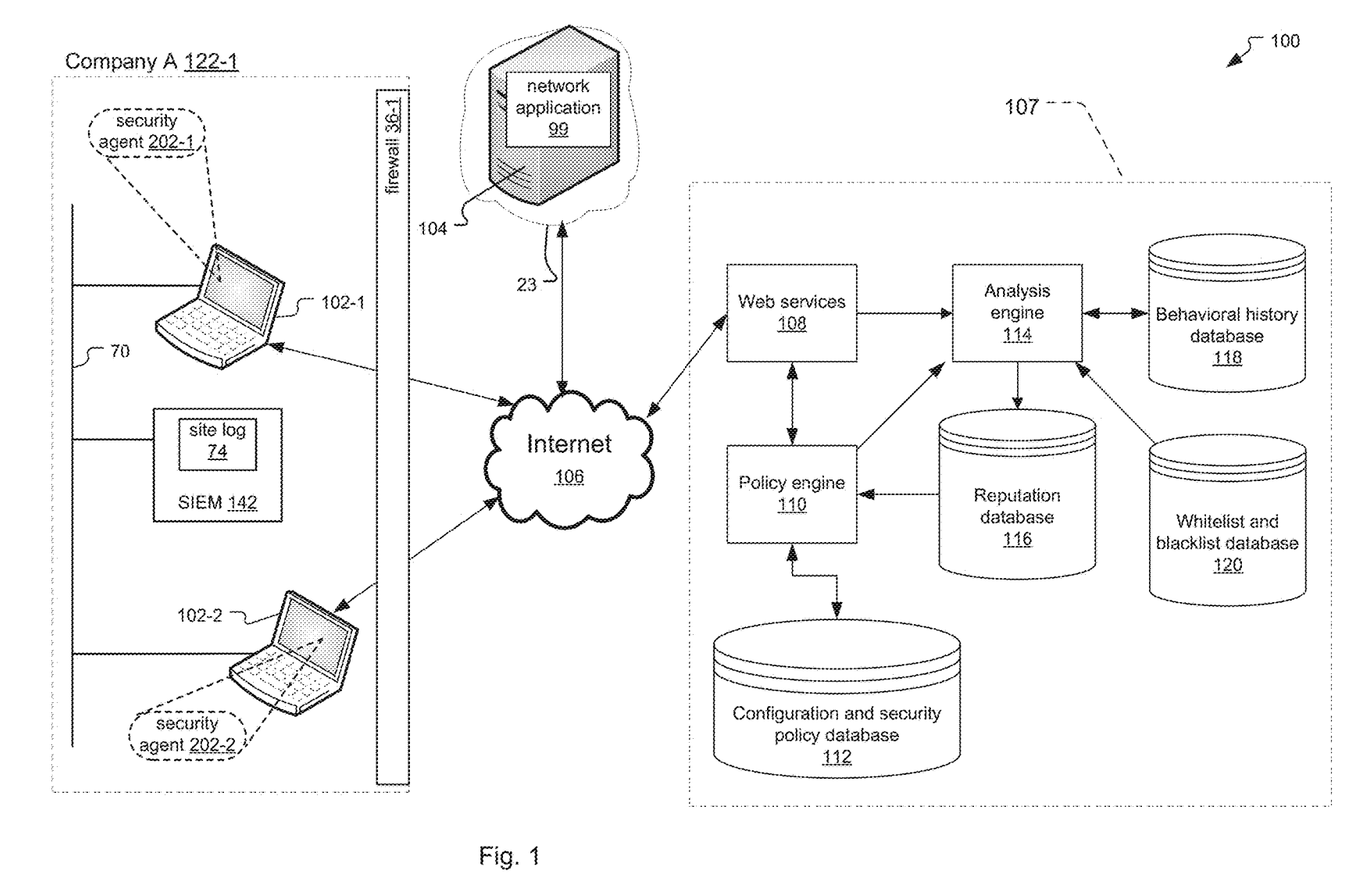
FIG. 1 is a schematic diagram of a distributed data security system that can identify and remediate reverse command shell attacks on user devices, such as user devices within an enterprise network of a company or business, where security agents running on the user devices identify and remediate the reverse command shell attacks at the process level on the user devices.

FIG. 1 shows an exemplary distributed data security system 100. The system 100 includes an endpoint telemetry aggregation system 107, and enterprise networks 70 of companies 122 that communicate over the Internet 106. The system 100 determines whether reverse command shell attacks upon user devices 102 within the enterprise networks have occurred.

A threat actor uses a network application 99 of the attack source device 104 to initiate the reverse command shell intrusion attacks. The attack source device 104 is often located in a network 23 that is remote from the enterprise networks 700 of the companies 122 upon which the threat actor launches the attacks.

In one embodiment, the endpoint telemetry aggregation system 107 is a Software as a Service ("SaaS") system located in a network that is also remote to the enterprise networks 70 of the companies 122. The endpoint telemetry aggregation system 107 provides its services to one or more companies or business entities, which are clients of the endpoint telemetry aggregation system 107.

Processes are software applications that execute upon an operating system of the user devices 102. In modern operating systems such as Linux and Windows, the addressable memory/address space is usually divided into two sections, user space and kernel space. Processes created by users, also known as user programs, reside in user space. The core/critical functions of the operating system, also known as the kernel, reside in kernel space. Generally, the user space is reserved for user programs and the kernel manages processes, system memory, and hardware components of the user devices 102.

The system 100 determines whether the reverse command shell attacks have occurred at a process level within the user devices, and remediates the processes determined to be associated with reverse command shell intrusion attacks. A security agent 202 process executing within each user device 102 detects reverse command shell intrusions associated with other processes executing on the user devices 102. To remediate processes which the security agent 202 determines are associated with reverse command shell intrusions, the security agent 202 executes security policies provided by the endpoint telemetry aggregation system 107, in one example.

In a preferred embodiment, the security agent 202 is a user level process that determines whether reverse command shell intrusions have occurred within other processes starting to execute upon the operating system 109 of the user devices 102. For this reason, the system 100 is said to operate at the process level of the user devices 102.

In the illustrated example, enterprise network 70 of Company A 122-1 includes user devices 102-1 and 102-2, each including security agents 202-1 and 202-2, respectfully. Within the enterprise network 70, the user devices 102 communicate with each other and with a Security Information and Event Manager (SIEM) 142 system over a local network 70. All communications exiting or entering the enterprise network 70 occur through a firewall 36-1.

In the illustrated embodiment, the endpoint telemetry aggregation system 107 includes a web services component 108, a policy engine 110, and an analysis engine 114. The web services component 108 receives requests for security policies from user devices 102 and forwards the requests to the policy engine 110. The policy engine 110, in turn, searches for the security policies in the configuration and security policy database 112 and reputation database 116. The analysis engine 114 calculates trust (or reputation) scores to determine the trustworthiness of the processes and whether the processes are malicious or benign, in examples.

The endpoint telemetry aggregation system 107 also includes a behavioral information database 118 that stores behavioral information about applications received from user devices 102-1 and 102 and includes a whitelist/blacklist database 120 that stores records of whitelisted and blacklisted processes.

Figure 2:
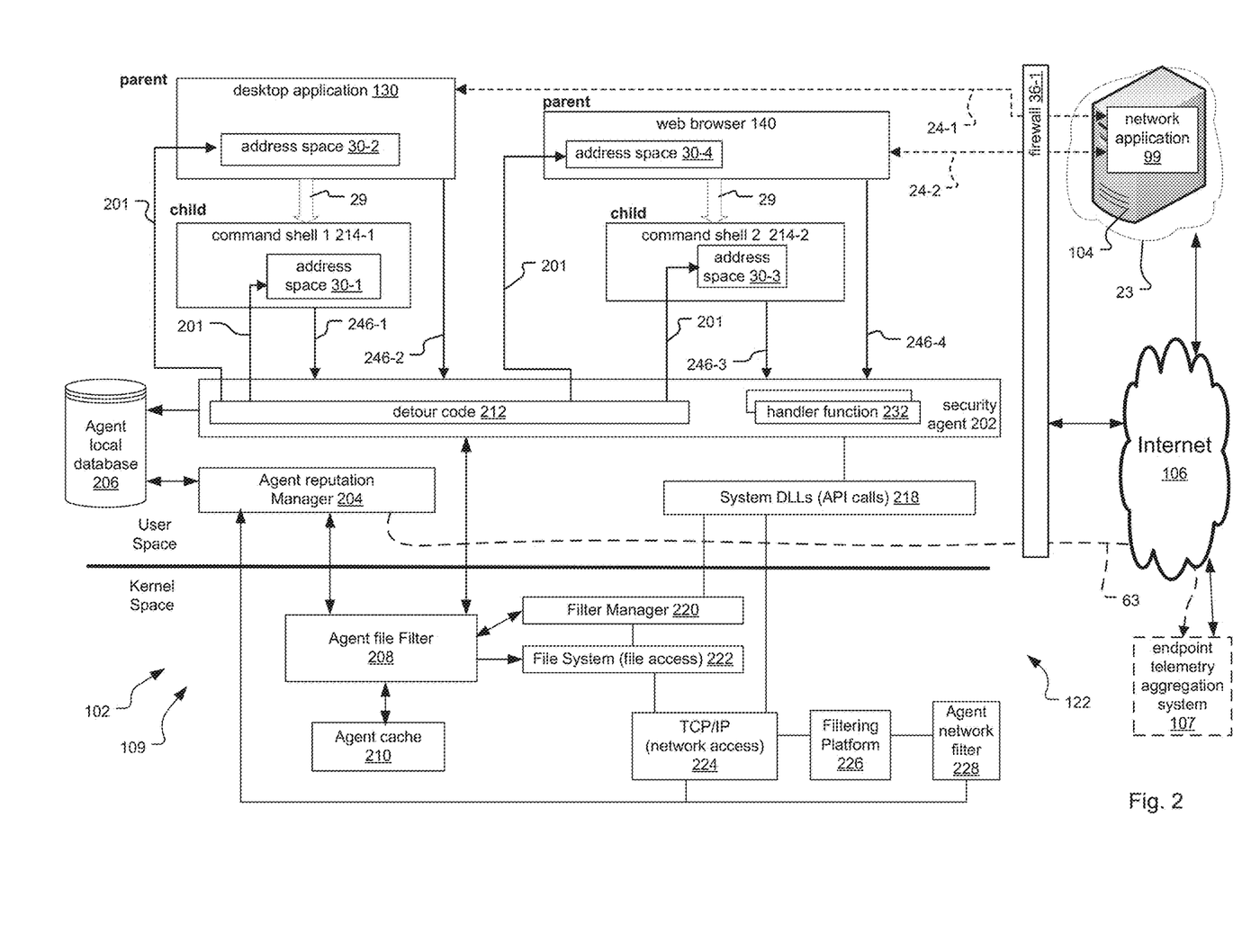

FIG. 2 provides details for interactions between exemplary processes starting on an operating system 100 of a user device 102 and a security agent 202 of the user device 102, when a possible reverse command shell attack is launched upon the user device 102. The illustrated example is for a Windows-based operating system sold by Microsoft Corp.

Different operating systems generally have different kernels and different user spaces. Moreover, even different versions of the same operating system typically have different kernels. Thus, the way in which the kernel interacts with software of the user space and hardware of the user devices 102 is different. These differences must be factored by the endpoint telemetry aggregation system 107 because different operating systems, kernels, and user spaces will have different vulnerabilities, and malware programs that are dangerous for one may be harmless to another.

In the illustrated example for a Windows operation system 109, the user space includes example processes executing on the operating system 109 such as a desktop application 130, a web browser 140, and system DLLs 218. A security agent 202 is also running on the user device 102. An agent reputation manager 204 communicates with the security agent 202 and an agent local database 206 that is accessible in user space. The security agent 202 includes executable detour code 212 of a detour function. The security agent 202 can also include one or more handler functions 232, in some embodiments.

The agent reputation manager 204 requests security policies from the endpoint telemetry aggregation system 107, indicated by reference 63. The agent reputation manager 204 then stores the received security policies to the agent local database 206. Because the system DLLs enable user space processes to access resources in kernel space via public Application Programming Interfaces (APIs), the system DLLs are also known as API calls 218.

In the illustrated example, the kernel includes an agent file filter 208 and an agent cache 210, which are used to map filenames of applications to corresponding hashes and enforces security policies for applications and processes. The kernel further includes device drivers, which enable software programs to interact with hardware of the user devices 102. For example, a filter manager 220 provides functionality required by filter drivers to monitor and control resource requests made to the file system. The file system 222 manages and organizes how data are used by the operating system 110. Some examples of file systems 222 for Windows operating systems include File Allocating Table (FAT32) and New Technology File System (NTFS), to list some examples.

Filter drivers are often optional drivers that are able to modify the behavior of a device. On user devices 102 running an operating system 110 such as Windows 7, filter drivers can be implemented for both file and network access. In the case where access control or content filtering needs to be performed on a file, the filter driver sits between an application and the underlying file system and has the ability to scan or restrict access to files based upon enforced security policy. For example, the file filter driver prevents an application (or executable) from being read, loaded into memory or executed if the file hash has been identified as being malware in one example. This is accomplished by returning an "Access Denied" status code to the calling application when an attempt was made to access the resource, in one example.

In one specific example, Microsoft Corp. has provided sample code (via the MSDN and the WDK documentation), which implements a variety of File System Minifilter Drivers. One such example, the SCANNER minifilter explains how a filter driver can detect a file access or file creation, scan the contents of the data looking for a "sample virus pattern" and report relevant information to a user level service daemon. This example shows how anti-virus/malware software can detect file access and scan the contents for virus signatures.

A TCP/IP driver 224 enables the user devices 102-1 to 102-n to have network access. The kernel further includes a filtering platform 226, which is a set of APIs and system services that provide features that can be used by packet processing or other connection monitoring services (e.g., firewalls). The kernel also includes an agent network filter 228, which is able to monitor and track all network connections made on a per process basis. If the application file's hash was flagged by a security policy, network connections may be denied or terminated on a per process basis by returning a failure code to a caller indicating the request to access the resource (in this case the network) is denied (or blocked).

The security agent 202 prepares each of the processes to monitor API calls 218 between each process and the operating system 109. For this purpose, the security agent 202 injects an instance of its executable detour code 212 into the address space 30 of each of the other processes as the other processes start on the user device 102. This injection is indicated by reference 201. The detour code 212 is loaded into memory of the processes before any executable code statements of the processes are loaded.

The detour code 212 within each process detects and intercepts API calls 218 between each process and the operating system 109. Using a trampoline technique such as used by Microsoft "Detours," in one example, the detour code 212 monitors the API calls 218 to identify an API call 218 of interest. The detour code 212 then modifies the code at the entry point of the API call 218 to execute a "jump" into the detour code 212, which intercepts (but does not otherwise block or interrupt) the API call 218. This non-blocking interception is also referred to as an ability of the detour code 212 to "hook into" an API call 218. The detour code 212 can then examine the API call 218 and its parameters. After a time, the detour code 212 executes a jump back into the code of the API call 218, which then executes the remainder of its code to complete the API call 218 between the process and the operating system 109.

Before the detour code 212 passes control back to the API call 218, the detour code 212 sends information 246 associated with the process and/or the API calls 218 to the security agent 202, for detailed monitoring and analysis. The security agent 202 can then determine whether a process is associated with a reverse command shell intrusion based on the information 246 and remediate the process associated with the reverse command shell intrusion.

Of the information 246 associated with the process and/or API calls 218, information associated with the process includes a reference to the process (e.g. address of the process in memory), a reference to the parent process of the process, and the name and type of the process and its parent process, in examples. Information associated with each API call 218 includes: a name and type of the API call 218; a function pointer to the API call 218; parameters/arguments passed to the API call 218; and the output of the API call 218, in examples. When dereferenced, a function pointer can be used to invoke the function to which the function pointer points.

In some embodiments, the detour code 212 of each process sends the information 246 to the security agent 202 via one or more handler functions 232 of the security agent 202. For this purpose, in one implementation, the security agent 202 can create a separate handler function 232 within the security agent 202 for each process. In response to the detour code 212 of each process intercepting API calls 218 between the process and the operating system 109, the detour code 212 calls its corresponding handler function 232, which receives the call information 246 of the intercepted API call 218. In another implementation, one handler function 232 provides this same capability for multiple processes.

The security agent 202 can then monitor and analyze the API calls 218 between the process and the operating system 109 within the handler function 232. The handler function 232 executes a jump back to the detour code 212 of the process (e.g. callback), and the detour code 212 in turn executes a jump back into the API call 218 to carry out the execution of the intercepted API call 218.

In one example, when a process invokes a Windows ReadFile( ) API, the injected detour code 212 of the process detects and hooks into the call, which intercepts the API call 218. The detour code 212 then calls a local version of the "ReadFile( )" function within the detour code 212, which examines the API call 218 and its parameters. The local "ReadFile( )" function sends information 246 for the API call 218 to the security agent 202 via the handler function 232 for the process within the security agent 202. The handler function 232 determines whether the process is associated with a reverse command shell intrusion based on the information 246 and "calls back" the local version of the "ReadFile( )" function within the detour code 212, which in turn returns control back to the original Windows ReadFile( ) API call 218.

Returning to the illustrated example, a threat actor using a network application 99 of an attack source device 104 initiates a remote command shell intrusion attack on a target user device 102. A network application 99 is an application or process running on one host (here, attack source device 104) that provides a communication to another application running on a different host as a target device. The attack source device 104 is usually located on a network such as the Internet 106 or another network 23 that connects to the Internet 106 that is remote to the enterprise network 70 that includes the targeted user devices 102.

Threat actors can launch reverse command shell intrusion attacks in different ways. In one scenario, the threat actor using a network application 99 on a remote attack source device 104 includes malware as an attachment to an email message. A user of the user device 102 opens the email and unwittingly opens the attachment, which executes the malware on the user device 102. The malware, in turn, attempts to open one or more unauthorized communication channels ("channel") 24 between the network application 99 and the user device 102. In the illustrated example, channel 24-1 is opened between the network application 99 of the attack source device 104 and the desktop application 130 and channel 24-2 is opened between the network application 99 and the web browser 140. In another attack scenario, the network application 99 makes an otherwise authorized connection to a process on the user device 102, but then issues commands that somehow compromise the process (e.g. create a buffer overflow). The network application 99 then sends commands to the compromised process for establishing the channels 24. In yet another attack scenario, a web browser 140 executes a malicious script in a web page and the malicious script establishes the channels 24.

Via the channels 24-1/24-2, the network application 99 sends commands to the desktop application 130/web browser 140. The commands sent over channel 24-1 instruct the desktop application 130 to create (reference 29) command shell 1, 214-1. The desktop application 130 is now a parent process of the created command shell 1 214-1, the latter of which is a child process of the desktop application 130. In a similar fashion, the commands sent over channel 24-2 instruct the web browser 140 to create (reference 29) command shell 2, 214-2. The web browser 140 is now a parent process of the created command shell 2 214-2, the latter of which is a child process of the web browser 140.

After the command shells 214 execute, the attack actor can then send additional commands over the channels 24 for execution upon the command shells 214. The additional commands typically invoke API calls 218 of the operating system 109. The command shells 214-1/214-2 then send their output back to the network application 99 over the unauthorized network connections 24 to the attack source device 104.

At the same time, as with any process that starts to execute on the operating system 109, the security agent 202 injects an instance of its detour code 212 into the address space 30-1 of the newly created command shell 1 214-1 and into the address space 30-3 of command shell 2 214-2. The detour code 212 of the processes are loaded into memory before any executable code statements of the command shells 214-1/214-2. The detour code 212 of command shell 1 214-1 detects and intercepts API calls 218 between command shell 1 214-1 and the operating system 109 and sends the information 246-1 associated with the intercepted API calls 218 to the security agent 202 for analysis. In a similar fashion, the detour code 212 of command shell 2 214-2 detects and intercepts API calls 218 between command shell 2 214-2 and the operating system 109 and sends the information 246-3 associated with the intercepted API calls 218 to the security agent 202. In one implementation, the security agent 202 creates a separate function known as a "trampoline" or callback function for handling the intercepted output from and/or information 246 sent by each process starting on the user device 102. The handler function 232 then returns control back to the detour code 212 of the process (e.g. callback).

The security agent 202 includes business logic that analyzes the information 246, and then executes a lookup of the security policies from the agent local database 206. The security agent 202 then executes the security policies to remediate processes affected by/associated with the detected reverse command shell intrusions.

The security agent 202 can also determine whether a process is associated with a reverse command shell attack by monitoring the parent process of each process starting to execute upon the operating system 109. For this purpose, the security agent 202 injects an instance of its detour executable code 212 into the address space 30-2 of the desktop application 130 and into the address space 30-4 of the web browser 140. The detour code 212 of the desktop application 130 and the web browser detect API calls 218 between each of the processes and the operating system 109, intercept/hook into the API calls 218, and send information 246-2 and 246-4 associated with the intercepted API calls 218 back to the security agent 202 for monitoring and analysis.

Figure 3:
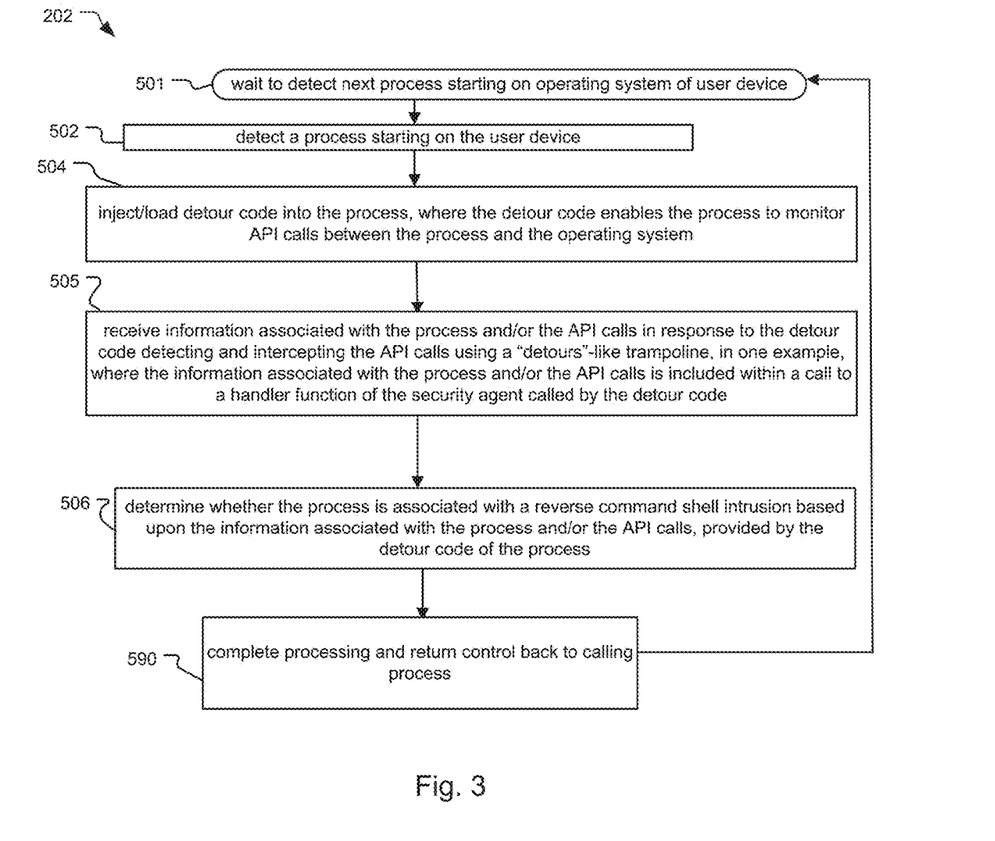
FIG. 3 is a flow diagram showing, in one embodiment, a method of the security agent 202 for remediating processes within each user device 102 that the security agent 202 determines are associated with a reverse command shell intrusion attack.

FIG. 3 shows a method of the security agent 202, according to one embodiment, for remediating processes within each user device 102 that the security agent 202 determines are associated with a reverse command shell intrusion attack.

In step 501, the security agent 202 waits to detect the next process starting on the operating system 109 of the user device 102.

Steps 502 through 505, described hereinbelow, collectively describe how the system 100 can detour API calls 218 between each process and the operating system 109 through the security agent 202 for monitoring and analysis.

In step 502, the security agent 202 detects a process starting on the user device 102. According to step 504, the security agent 202 injects or loads detour code 212 of a detour function into the process, where the detour code 212 enables monitoring of API calls 218 between the process and the operating system 109. In one example, the detour code 212 is included within a Windows Dynamically Linked Library (DLL). In another example, the detour code 212 is included within a shared library on a UNIX/Linux-based operating system 109.

In step 505, the security agent 202 receives information 246 sent by the detour code 212 of the process, in response to the detour code 212 detecting and intercepting API calls 218 between the process and the operating system 109. In one implementation, the detour code 212 uses a "detours"-like trampoline for this purpose, where the information associated with the process and/or the API calls is included within a call to a handler function 232 of the security agent 202 called by the detour code 212. The call to the handler function 232 also typically includes the name of a callback function of the detour code 212.

In step 506, the security agent determines whether the process is associated with a reverse command shell intrusion based upon the information associated with the process and/or the API calls, provided by the detour code 212 of the process.

Figure 4:
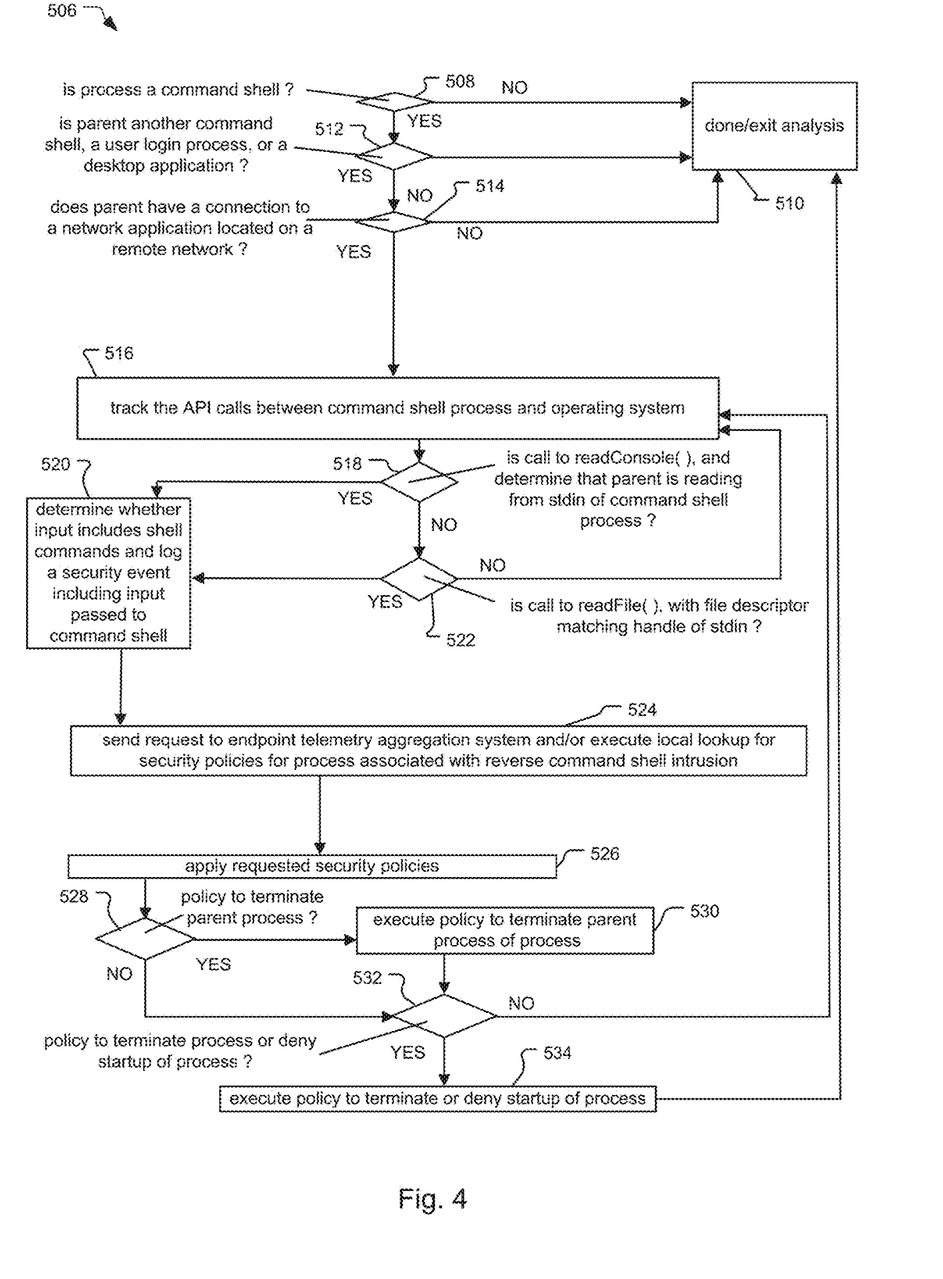
FIG. 4 is a flow diagram that provides more detail for the method of FIG. 3.

FIG. 4 provides detail for step 506 of FIG. 3.

Because the security agent 202 detects and analyzes each process starting on the user device 102, there is the potential for the security agent 202 to consume a significant amount of operating system 109 resources in the presence of many processes starting on the operating system 109. To minimize the processing load upon the operating system 109, in one implementation, the security agent 202 first determines preliminary information associated with the process itself, in steps 508, 512, and 514. If the preliminary information concerning the process itself is not indicative of a reverse command shell intrusion, the security agent 202 ends its analysis of the current process, in step 510.

In step 508, the security agent 202 then determines if the process is a command shell 214. If the process is not a command shell 214, the method transitions to step 510 to end its analysis of the current process. Otherwise, the method transitions to step 512.

According to step 512, the method then analyzes information associated with the parent process of the command shell process 214. If the parent process is another command shell, a user login process, or the desktop application 130, the method transitions to step 510 to end its analysis of the process. Otherwise, the method transitions to step 514. In step 514, the method then determines whether the parent process is a network application 99. If the parent process is not a network application 99, the method transitions to step 510 to end its analysis of the process. Otherwise, the method transitions to step 516.

In step 516, the security agent 202 tracks API calls 218 between the command shell process and the operating system 109. Then, in step 518, the security agent 202 determines if the API call 218 is a call to ReadConsole( ). In one example, the API call is ReadConsole A/W for a Windows operating system 109. In response to the detour code 212 of the process hooking ReadConsoleA/W( ), the security agent 202 can determine whether the parent process (and therefore whether the network application 99 connected to the parent process) is reading from the stdin stream of the command shell process. If this statement is true, the method transitions to step 520. Otherwise, the method transitions to step 522.

In step 522, the security agent 202 determines if the API call 218 is a call to ReadFile( ), with a file handle/descriptor of stdin (standard input). If the file descriptor matches the handle to the stdin stream, the security agent 202 can determine whether the parent process (and therefore whether the network application 99 connected to the parent process) is passing commands to the command shell process for execution. If this statement is true, the method transitions to step 520. Otherwise, the method transitions back to step 516 to continue tracking the API calls 218.

In a similar fashion, the detour code 212 can hook into API calls WriteConsoleA/W( ) and WriteFile( ) and provide information associated with these calls to the security agent 202, which in turn can identify output of the command shell process from this information. For example, the security agent 202 can track WriteConsoleA/W( ) to determine whether the parent process (and therefore whether the network application 99 connected to the parent process) is writing to the stdout stream of the command shell process. The security agent 202 can then track WriteFile( ), and identify a file handle/descriptor of the stdout (standard output) stream of the child process. If the file descriptor matches the handle to the stdout stream, the security agent 202 can determine whether the child process is providing command output to the parent process (and therefore to the network application 99 connected to the parent process).

In step 520, the security agent 202 determines whether the input includes shell commands and logs a security event including the input passed to command shell. In one example, to determine the input passed to the command shell, including identifying any shell commands within the input, the security agent 202 parses the stdin stream of the child process and compares its contents to lists of shell commands/patterns of shell commands associated with known reverse command shell intrusions stored in the policy engine 110. The security agent 202 can also execute this lookup against its agent local database 206 when the security agent is configured to request (or receive) periodic updates of security policies and/or lists of shell commands/patterns of commands from the policy engine 110.

The lists and/or patterns of commands include sequences and/or types of shell commands which have been historically associated with reverse command shell intrusions and known attack signatures. For the Windows operating system 109, in one example, commands that recursively access Windows operating system "hidden" files and/or directories and contents of user files for multiple users suggests that a remote attacker is attempting to access critical system resources and user files for multiple users. Another example is a series of commands to disable and/or modify the state of Windows services.

Upon determining that the parent process (and therefore the network application connected to the parent process) is passing shell commands to the child process, the security agent 202 can conclude that the process is associated with a reverse command shell intrusion.

The security agent 202 in step 524 requests security policies from the endpoint telemetry aggregation system 107 for the process associated with the reverse command shell intrusion. Typically, the security agent 202 executes a real-time lookup of security policies in the agent local database 206, which the agent reputation manager 204 has previously obtained from the endpoint telemetry aggregation system 107 and stored to the agent local database 206. When a process runs for the first time, the security agent 202 may issue a request to the telemetry system 107 for trust/reputation information concerning the process to determine whether the process is trusted (i.e. is it known malware).

The security policies include actions that the security agent 202 can execute to remediate processes determined to be associated with reverse command shell intrusions. The actions include termination of the child command process, its parent process, and denying startup of the child command process, in examples.

The security agent 202 applies the security policies in step 526.

If the security policy in step 528 specifies termination of the parent process, the security agent 202 transitions to step 530; otherwise, the method transitions to step 532. The security agent 202 executes the policy to terminate the parent process in step 530, and transitions to step 532.

In step 532, if the security policy specifies termination of the process or specifies that the security agent 202 deny startup of the process, the security agent 202 transitions to step 534. Otherwise, the method transitions to step 516 to monitor more API calls 218. The security agent 202 executes the policy to terminate the process or deny startup of the process in step 534, and then transitions to step 510 to end analysis for the current process.

Upon completion of step 510, the method transitions back to the method of FIG. 3 at the conclusion of step 506.

Returning to FIG. 3, in step 590, the security agent 202 completes any final processing and returns control back to the calling process, such as via a callback function provided by the detour code 212. The method then transitions to step 501 to wait for the next process to start on the user device 102.

Figure 5:
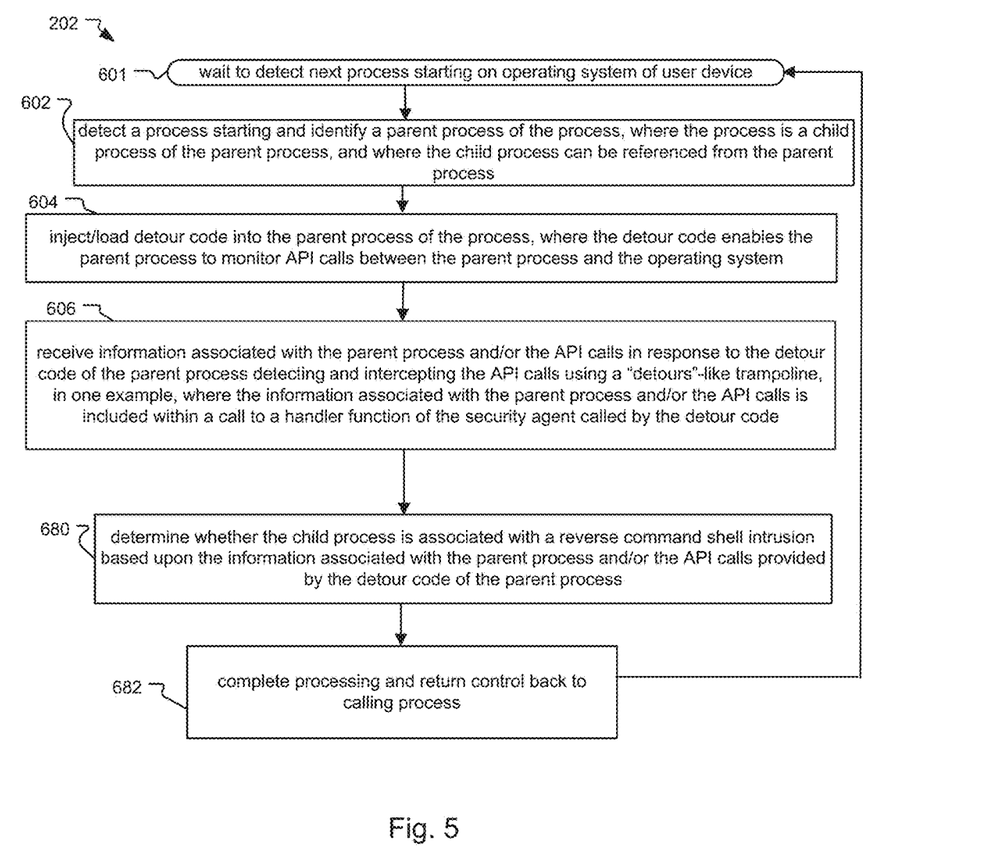
FIG. 5 is a flow diagram showing, in another embodiment, another method of the security agent 202 for remediating processes within each user device 102 that the security agent 202 determines are associated with a reverse command shell intrusion attack.

FIG. 5 shows a method of the security agent 202, according to another embodiment, for remediating processes within each user device 102 that the security agent 202 determines are associated with a reverse command shell intrusion attack. Unlike the method of FIG. 3, however, the method of FIG. 5 analyzes information associated with the parent process of each process to determine whether each process is associated with a reverse command shell intrusion attack.

In step 601, the security agent 202 waits to detect the next process starting on the operating system 109 of the user device 102.

Steps 602 through 606, described herein below, collectively describe how the system 100 can detour API calls 218 between a parent process of each process and the operating system 109 to the security agent 202 for monitoring and analysis.

In step 602, the security agent 202 detects a process starting on the user device 102 and identifies the parent process of the process, where the process itself is a child process of the parent process.

According to step 604, the security agent 202 injects or loads detour code 212 of a detour function into the parent process of the process, where the detour code 212 enables monitoring of API calls between the parent process and the operating system 109. In one example, the detour code 212 is included within a dynamically linked library (DLL) for a Windows operating system 109.

In step 606, the security agent 202 receives call information 246 sent by the detour code 212 of the parent process, in response to the detour code 212 of the parent process detecting and intercepting (e.g. hooking into) API calls 218 between the parent process and the operating system 109. For Windows operating systems 109, in one example, the detour code 212 hooks into a set of WIN32 API calls 218, via a "detours"-like trampoline. In one example, the call information 246, which here is the information associated with the parent process and/or the API calls 218 between the parent process and the operating system 109, is included within a call to a handler function 232 of the security agent 202 called by the detour code 212 of the parent process.

In step 680, the security agent 202 determines whether the child process is associated with a reverse command shell intrusion based upon the information associated with the parent process and/or the API calls 218 provided by the detour code 212 of the parent process.

Figure 6:
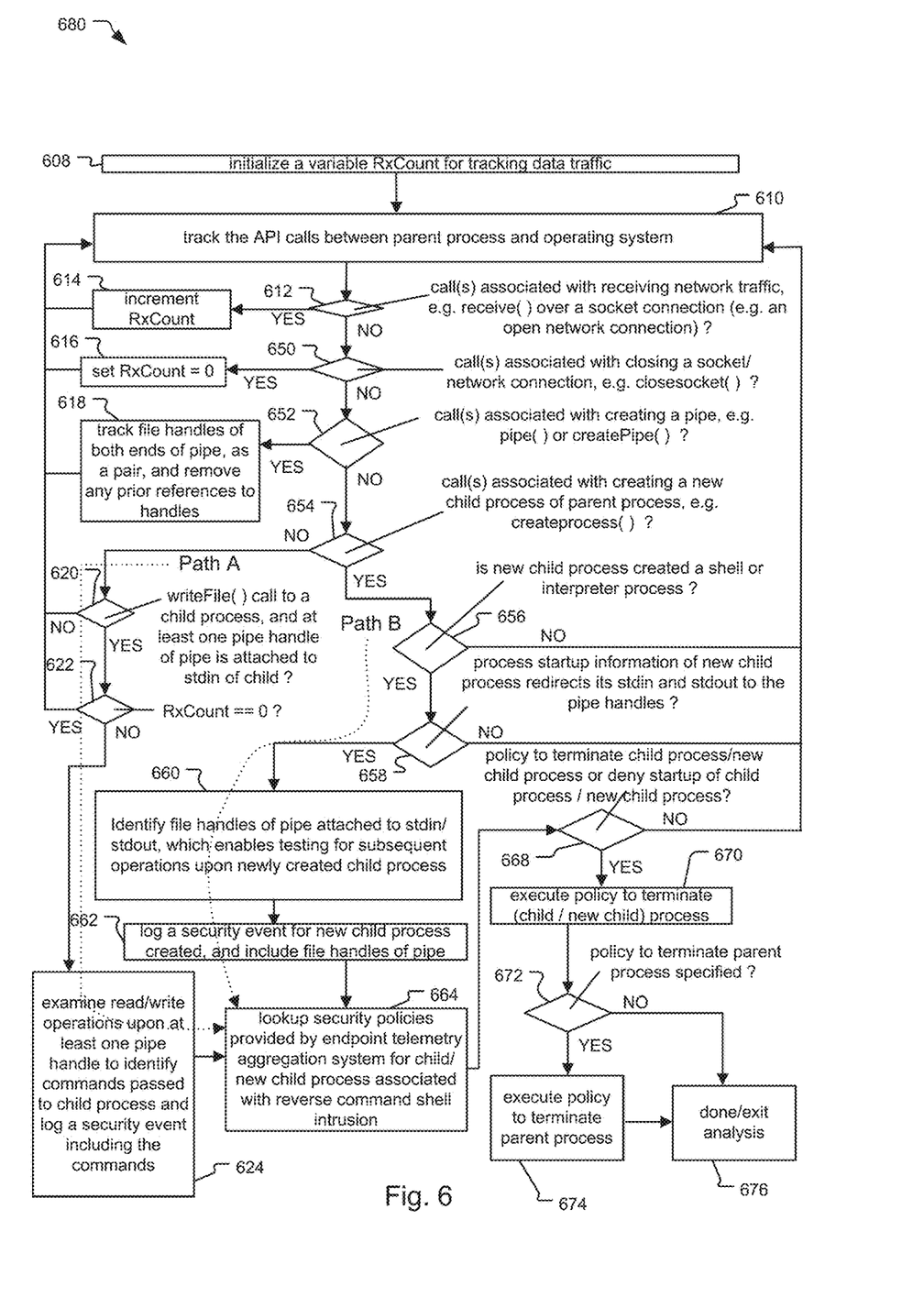
FIG. 6 is a flow diagram that provides more detail for the method of FIG. 5.

FIG. 6 provides detail for step 680 of FIG. 5.

In step 608, the security agent 202 initializes a variable, "RxCount," for tracking data traffic. Then, in step 610, the security agent 202 tracks API calls 218 between the parent process and the operating system 110.

In step 612, the security agent 202 detects whether the call(s) 218 are associated with receiving network traffic, e.g. receive( ) over a socket connection (e.g. an open network connection). In one example, this network connection includes a command/control channel 24 between the parent process and a remote network application 99. If the statement is true, the security agent 202 increments the RxCount in step 614, and the method transitions back to step 610 to track more API calls 218. Otherwise, the method transitions to step 650.

In step 650, the security agent 202 detects whether the call(s) 218 are associated with closing a socket/network connection, such as closesocket( ). If the statement is true, the security agent 202 sets the RxCount to 0 in step 616, and the method transitions back to step 610 to track more API calls 218. Otherwise, the method transitions to step 652.

According to step 652, the security agent 202 detects whether the call(s) 218 are associated with creating a pipe, such as pipe( ) or createPipe( ) in examples. If the statement is true, the security agent 202 tracks file handles of both ends of pipe, as a pair, and removes any prior references to handles in step 618, and the method transitions back to step 610 to track more API calls 218. The handles could be associated with a named pipe, in one example. Flagging these handles enables the detection of subsequent operations associated with a potential reverse command shell intrusion upon the child process. Otherwise, the method transitions to step 654.

In step 654, the security agent 202 executes two paths, labeled Path A and Path B, each of which may ultimately meet at common step 664. The steps along Path A are described first, followed by the steps of Path B.

Path A begins when the security agent 202, in step 654, detects that the API call(s) 218 are not associated with creating a new process, such as via the createprocess( ) API call 218. The method then transitions to step 620. In step 620, the security agent 202 detects whether the API calls 218 include a WriteFile( ) to the child process, and determines whether at least one pipe handle/file handle of the pipe is attached to standard input (stdin) of the child. If this statement is false, the method transitions back to step 610 to track more API calls 218. Otherwise, the method transitions to step 622.

In step 622, the security agent 202 determines if RxCount=0. If this statement is true, the method transitions back to step 610 to track more API calls 218. Otherwise, the method transitions to step 624. For the RxCount to be non-zero at this point in Path A, the security agent 202 has determined that there is either 1) an open network connection 24 to the parent process, where the open network connection is still receiving network traffic, or 2) that a pipe has been created between the parent process and some unknown/yet to be identified network application 99 at the other end of the pipe.

At step 624, the security agent 202 examines read/write operations upon at least one pipe handle to identify commands passed to the child process and logs a security event including any command input passed to the child process. As in the method of FIG. 3, the security agent 202 executes a lookup of the contents of the stream associated with the file handle of the pipe against lists/patterns of known shell commands provided by the policy engine 110 to determine whether the parent process is passing shell commands indicative of a reverse command shell intrusion to a child process and to identify the shell commands within the stream.

Upon determining that the parent process (and therefore the network application connected to the parent process) is passing shell commands to the child process, the security agent 202 can conclude that the child process is associated with a reverse command shell intrusion.

The method then transitions to step 664, which is common to Path A and Path B. Step 664 is described in more detail herein below in conjunction with the description of steps associated with Path B.

Path B begins when the security agent 202, in step 654, detects that the API calls 218 are associated with creating a new process (e.g. createprocess( )), whether the process created is a new child process of the parent process. The method then transitions to step 656.

In step 656, the security agent 202 detects if the new process created is a command shell process or an interpreter process. Interpreter processes are computer programs that directly execute instructions written in a programming or scripting language, without previously compiling them into a machine language program. The instructions execute upon the operating systems 109. Examples of interpreter processes include Perl, Python, and javascript, in examples. If the new process created is neither a command shell process nor an interpreter process (e.g. the result of step 656 is false), the method transitions back to step 610 to track more API calls 218. Otherwise, the method transitions to step 658.

In step 658, the security agent 202 determines if the process startup information of the new process redirects stdin and stdout to the pipe handles created in step 652. If this statement is false, the method transitions back to step 610 to track more API calls 218. Otherwise, the method transitions to step 660.

In step 660, the security agent 202 identifies the file handles of the pipe attached to stdin/stdout. The handles could be associated with a named pipe, in one example. Flagging these handles enables the detection of a subsequent operation associated with a potential reverse command shell intrusion upon the newly created process, such as testing for write operations upon the newly created child process in step 620.

Upon determining that the parent process (and therefore the network application 99 connected to the parent process) is passing shell commands to the new child process, the security agent 202 can conclude that the new child process is associated with a reverse command shell intrusion.

In step 662, the security agent 202 also logs a security event for the new child process previously created in step 656, and includes file handles of the pipe previously created in step 652. The method then transitions to common step 664 among Path B and Path A.

In step 664, upon determining that the child process (or new child process) is associated with a reverse command shell intrusion, the security agent 202 looks up security policies provided by the endpoint telemetry aggregation system 107 for the child process associated with the reverse command shell intrusion. The security agent 202 executes the security policies to remediate the processes associated with the reverse command shell intrusion.

In step 668, the security agent 202 determines whether the policy specifies to terminate the child process/new child process or deny startup of the child process/new child process as a remediation measure, in examples. If this statement is false, the method transitions back to step 610 to track more API calls 218. It is also important to note that when the method detects creation of a new child process in accordance with the steps of Path B, when the method transitions back to step 610 to track more API calls 218, the new child process is treated as an existing child process for the next iteration of tests. Otherwise, the method transitions to step 670.

According to step 670, the security agent 202 executes the policy to terminate the child process/new child process. In step 672, the security agent 202 determines if the policy specifies to also terminate the parent process. If the policy specifies termination of the parent process, the security agent 202 terminates the parent process in step 674 and then transitions to step 676. If the policy in step 672 does not specify termination of the parent process, the security agent 202 also transitions to step 676. Then, in step 676, the security agent 202 ends analysis of the parent process/child process and the method transitions back to the method of FIG. 5 at the conclusion of step 660.

Returning to FIG. 5, in step 682, the security agent 202 completes any final processing and returns control back to the calling process, such as via a callback function provided by the detour code 212. In one example, the final processing includes providing updates to the lists of commands/attack command patterns to the policy engine 110 upon determining that the child process is associated with a reverse command shell intrusion. The method then transitions to step 601 to wait to detect the next process starting on the user device 102.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for tracking a reverse command shell intrusion on a user device, the method comprising:
   detecting a process starting on the user device;
   preparing the process to monitor Application Programming Interface (API) calls between the process and an operating system of the user device;
   determining whether the process is associated with a reverse command shell intrusion based on information associated with the process and/or the API calls; and
   executing security policies against the process associated with the reverse command shell intrusion;

wherein determining whether the process is associated with a reverse command shell intrusion based upon the information associated with the process and/or the API calls comprises:

determining whether the process is a command shell process and analyzing a parent process of the command shell process and determining a possible existence of a reverse shell intrusion in response to determining that the process is a command shell process and that the parent process of the command shell process is a command shell process, a user login process, or a desktop process; or determining whether the process is a command shell process and analyzing a parent process of the command shell process, analyzing a connection of the parent process, and determining a possible existence of reverse shell intrusion in response to determining that the connection of the parent process has a connection to a network application located in a network that is remote; or determining that the process is a command shell process and analyzing a parent process of the command shell process, detecting a readFile( ) API call, determining that a file descriptor of the readFile( ) API call matches a handle to a stdin stream of the command shell process, identifying commands passed by the parent process to the command shell process in the stdin stream of the command shell process, and concluding whether the process is a reverse command shell intrusion based on the commands; or determining that the process is a command shell process and analyzing a parent process of the command shell process, detecting a readConsole( ) API call, determining based on the readConsole( ) API call that the parent process is reading from a stdin stream of the command shell process, identifying commands passed by the parent process to the command shell process in the stdin stream of the command shell process, and concluding whether the process is a reverse command shell intrusion based on the commands.

2. A user device including system memory and hardware components, the user device executing a system for tracking a reverse command shell intrusion on the user device, the system comprising:

an endpoint telemetry aggregation system that stores security policies for remediating processes executing on the user device that are associated with a reverse command shell intrusion; and a security agent executing on the user device that:

prepares a process to monitor Application Programming Interface (API) calls between the process and an operating system of the user device;

receives information associated with the process and/or the API calls, sent from the process;

determines whether the process is associated with a reverse command shell intrusion based on the information associated with the process and/or the API calls;

requests the security policies from the endpoint telemetry aggregation system; and executes the security policies against the process associated with the reverse command shell intrusion;

wherein the security agent determines whether the process is associated with a reverse command shell intrusion by:

determining whether the process is a command shell process and analyzing a parent process of the command shell process and determining a possible existence of a reverse shell intrusion in response to determining that the process is a command shell process and that the parent process of the command shell process is a command shell process, a user login process, or a desktop process; or determining whether the process is a command shell process and analyzing a parent process of the command shell process, analyzing a connection of the parent process, and determining a possible existence of reverse shell intrusion in response to determining that the connection of the parent process has a connection to a network application located in a network that is remote; or determining that the process is a command shell process and analyzing a parent process of the command shell process, detecting a readFile( ) API call, determining that a file descriptor of the readFile( ) API call matches a handle to a stdin stream of the command shell process, identifying commands passed by the parent process to the command shell process in the stdin stream of the command shell process, and concluding whether the process is a reverse command shell intrusion based on the commands; or determining that the process is a command shell process and analyzing a parent process of the command shell process, detecting a readConsole( ) API call, determining based on the readConsole( ) API call that the parent process is reading from a stdin stream of the command shell process, identifying commands passed by the parent process to the command shell process in the stdin stream of the command shell process, and concluding whether the process is a reverse command shell intrusion based on the commands.

3. The user device of claim 2, wherein the process associated with the reverse command shell intrusion is a command-line interpreter program that is native to the operating system of the user device, a script interpreter program, and/or a database application that takes Software Query Language (SQL) commands as input for accessing a database.

* * * * *